US005465823A

United States Patent [19]

Schoeneweiss

[11] Patent Number: 5,465,823

[45] Date of Patent: Nov. 14, 1995

[54] HANDRAIL INLET ELEMENT OF AN ESCALATOR, A MOVING WALKWAY OR THE LIKE

[75] Inventor: Klaus Schoeneweiss, Hattingen, Germany

[73] Assignee: O&K Orenstein & Koppel AG, Berlin, Germany

[21] Appl. No.: 256,072

[22] PCT Filed: Jun. 9, 1993

[86] PCT No.: PCT/EP93/01455

§ 371 Date: Jun. 23, 1994

§ 102(e) Date: Jun. 23, 1994

[87] PCT Pub. No.: WO94/05584

PCT Pub. Date: Mar. 17, 1994

[30] Foreign Application Priority Data

Sep. 8, 1992 [DE] Germany .......................... 42 29 994.2

[51] Int. Cl.[6] .................................................... B65G 17/00

[52] U.S. Cl. ............................................................ 198/338

[58] Field of Search ..................................... 198/323, 338

[56] References Cited

U.S. PATENT DOCUMENTS

| | | | |
|---|---|---|---|
| 2,550,918 | 5/1951 | Felix et al. | 198/338 |
| 3,910,400 | 10/1975 | Hishitani . | |
| 3,970,187 | 7/1976 | Esaki et al. | 198/338 |
| 4,619,355 | 10/1986 | Adrian et al. . | |

FOREIGN PATENT DOCUMENTS

| | | |
|---|---|---|
| 0420061 | 4/1991 | European Pat. Off. . |
| 1169629 | 5/1964 | Germany . |
| 3437968 | 4/1986 | Germany . |

*Primary Examiner*—Joseph E. Valenza
*Attorney, Agent, or Firm*—Spencer, Frank & Schneider

[57] ABSTRACT

A handrail inlet element for an escalator having a handrail. The handrail inlet element is positioned in a lower banister area of the escalator, and includes two separate elements arranged around the handrail. One of the separate elements includes a recess, and the other of the separate elements includes a corresponding projection for engaging the recess to fix the two separate elements together.

11 Claims, 1 Drawing Sheet

HANDRAIL INLET ELEMENT OF AN ESCALATOR, A MOVING WALKWAY OR THE LIKE

The invention relates to a handrail inlet element of an escalator, a moving walkway or the like, which is disposed in the lower banister area.

An inlet guide in connection with escalators is known from German Patent DE-PS 11 69 629, which discloses a resilient protective frame that almost completely covers the gap remaining between the handrail profile and the adjacent escalator sheathing and which therefore closely surrounds the handrail profile this known inlet guide is provided with a shut-off contact disposed behind the inlet opening, which stops the escalator drive, the switching lever of which terminates in the vicinity of the handrail and is movable in the direction of movement of the handrail for activating the shut-off contact. The protective frame is formed by an elastically giving rubber profile. The switching lever for the switch-off contact rests directly on the rubber profile. The rubber profile, which is hose-like, is adapted to the greatest possible extent to the contours of the handrail profile. For this reason a gap respectively remains in the upper area of the handrail inlet between the handrail inlet element and the handrail wheel, because of which there is a danger of objects being inserted at this place which might cause too late a shut-off and might possibly result in considerable injuries.

SUMMARY OF THE INVENTION

It is the object of the invention to provide a handrail inlet element which is simple to construct and is completely closed in the installed state and that does not have the disadvantages of the prior art.

This object is attained in accordance with the invention by providing two separate elements which can be placed around the handrail and which can be arrested with respect to each other by projections provided on one of the separate elements and engaging corresponding recesses on the other element.

Advantageous further embodiments of the invention ensue from the dependent claims.

Because of the split into two parts of the handrail inlet element, there are no difficulties in removing or re-installing the handrail inlet element, either during initial assembly or during subsequent repairs or replacement of the handrail. The separate elements, which are either non-positively or positively connected with each other, can be connected or separated without problems, so that the assembly/disassembly outlay for the handrail can be reduced a considerable extent. In this case the separate elements preferably have the same shape, so that only a single vulcanizing tool is required. An elastomer bellows is attached by vulcanization to the respectively angularly embodied retaining element, wherein the separate elements (halves) can be preferably fixed with respect to each other using rubber nubs or the like. The rubber nubs can be slightly conical for ease of insertion. The rubber nubs may be used only for fixing and not for connecting the separate elements together. In such a situation it is possible to connect the two retaining elements with each other, if necessary via intermediate elements, after the separate elements have been fastened around the handrail. A safety device for shutting off the escalator drive can be provided in the area of the legs pointing away from the bellows, which reacts to the elastic deformation of the bellows sections.

BRIEF DESCRIPTION OF THE DRAWINGS

The invention is illustrated in the drawings by means of an exemplary embodiment and will be described in what follows. Shown are in.

DETAILED DESCRIPTION OF THE INVENTION

Figure 2:
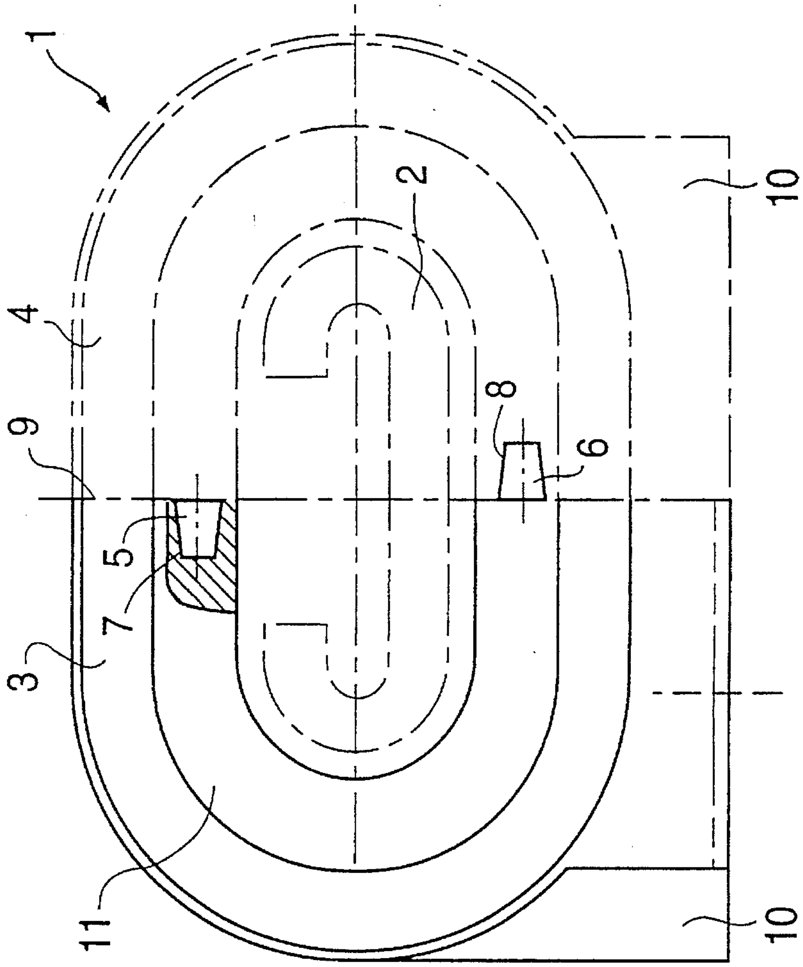
FIGS. 1 and 2, show a lateral view and a front view, respectively of the handrail inlet element of the invention.
Figure 1:
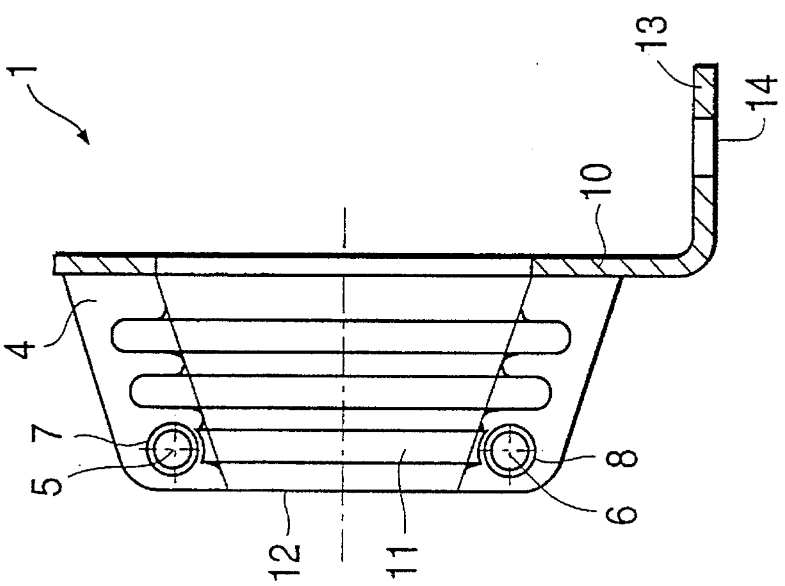

FIGS. 1 and 2 show the handrail inlet element 1 of the invention once in a lateral view and again in a front view, wherein the handrail 2 is only sketched. The handrail inlet element consists of two separate elements 3, 4 which are provided with a respective projection 5, 6 engaging a corresponding recess 7, 8 of the other element. The line of contact of the two separate elements 3, 4 has here been identified by 9. Each one of the separate elements 3, 4 has a retaining element 10, angular in cross section, to which an elastically deformable bellows section 11 has been attached by vulcanization. In this case the projections 5, 6 as well as the recesses 7, 8 are provided in the area of the free front face 12 of the respective bellows section 11. The retaining elements 10 are connected with the bellows sections 11 by vulcanization, wherein the projections 5, 6 and the recesses 7, 8 were formed in an analogous manner by appropriate profiles in the vulcanization mold. So as to require only one vulcanization mold for both separate elements 3, 4, the projections 5, 6 and the recesses 7, 8 are disposed opposite each other. Starting at the retaining element 10, the bellows sections 11 taper in the direction of their free front face 12. The legs 13 of the retaining elements 10 facing away from the bellows sections 11 have a through-bore 14. The two retaining elements 10 can be connected with each other via intermediate elements, not shown here (plates or the like, which can also have corresponding through-bores). For the purpose of easier connection of the separate elements 3, 4, the projections 5, 6 are embodied to taper conically, and the recesses 7, 8 have a matching opposite profile.

I claim:

1. A handrail inlet element for an escalator having a handrail, said handrail inlet element being positioned in a lower banister area of the escalator and comprising:

two separate elements arranged around the handrail, one of said separate elements including a recess, and the other of said separate elements including a corresponding projection for engaging the recess to fix said two separate elements together, each said separate element including a retaining element and an elastically deformable bellows section connected to said retaining element.

2. A handrail inlet element as defined in claim 1, wherein said bellows section is vulcanized to said retaining element.

3. A handrail inlet element as defined in claims 1, wherein said bellows section is conically tapered beginning at said retaining element.

4. A handrail inlet element as defined in claim 1, wherein said projection and said recess is vulcanized to said bellows section.

5. A handrail inlet element as defined in claim 4, wherein said bellows section has a free front face, said projection and said recess being located in a region of said free front face.

6. A handrail inlet element as defined in claim 1, wherein each said retaining element has an angular cross-section forming a leg extending away from said bellows section, said leg including a through bore for connecting respective retaining elements together.

7. A handrail inlet element as defined in claim 6, further comprising an intermediate element insertable into the through bores for connecting said respective retaining elements together.

8. A handrail inlet element as defined in claim 7, wherein said intermediate element comprises a screw.

9. A handrail inlet element as defined in claim 1, wherein each said separate element includes a respective recess and a respective projection, said respective projection of one separate element being orientated to project toward the other separate element for engaging the respective recess of the other separate element.

10. A handrail inlet element as defined in claim 1, wherein said respective projections are located in respective different planes and are arranged to project towards one another.

11. A handrail inlet element for an escalator having a handrail, said handrail inlet element being positioned in a lower banister area of the escalator and comprising:

two separate elements arranged around the handrail, one of said separate elements including a recess having a profile, and the other of said separate elements including a projection having a profile corresponding to the recess profile and tapering conically in a direction of said one separate element for engaging the recess to fix said two separate elements together.

* * * * *